US 9,225,963 B2

(12) United States Patent
Sakaniwa et al.

(10) Patent No.: US 9,225,963 B2
(45) Date of Patent: Dec. 29, 2015

(54) VIDEO DISPLAY SYSTEM, DISPLAY APPARATUS, AND DISPLAY METHOD

(75) Inventors: Hidenori Sakaniwa, Tokyo (JP);
Nobuaki Kabuto, Tokyo (JP)

(73) Assignee: HITACHI MAXELL, LTD., Osaka (JP)

( * ) Notice: Subject to any disclaimer, the term of this patent is extended or adjusted under 35 U.S.C. 154(b) by 115 days.

(21) Appl. No.: 14/009,566

(22) PCT Filed: Apr. 4, 2012

(86) PCT No.: PCT/JP2012/059217
§ 371 (c)(1),
(2), (4) Date: Oct. 3, 2013

(87) PCT Pub. No.: WO2012/137829
PCT Pub. Date: Oct. 11, 2012

(65) Prior Publication Data
US 2014/0016908 A1    Jan. 16, 2014

(30) Foreign Application Priority Data

Apr. 4, 2011  (JP) ................................ 2011-082397

(51) Int. Cl.
*H04N 5/775* (2006.01)
*H04N 5/765* (2006.01)
(Continued)

(52) U.S. Cl.
CPC ....... *H04N 13/0055* (2013.01); *H04N 13/0429* (2013.01); *H04N 13/0452* (2013.01); *H04N 13/0497* (2013.01)

(58) Field of Classification Search
USPC .................................................. 386/23–248
See application file for complete search history.

(56) References Cited

U.S. PATENT DOCUMENTS

2009/0220213 A1    9/2009  Ogawa et al.
2010/0208042 A1*   8/2010  Ikeda et al. ..................... 348/53
(Continued)

FOREIGN PATENT DOCUMENTS

JP    2003-333624 A    11/2003
JP    2010-233211 A    10/2010
(Continued)

*Primary Examiner* — Hung Dang
(74) *Attorney, Agent, or Firm* — Baker Botts L.L.P.

(57) ABSTRACT

A video display system, having a reproduce apparatus, which is configured to reproduce content, thereby to output, and a display apparatus, which is configured to display the content outputted from the reproduce apparatus, wherein said display apparatus, when being inputted therein a 3D content, including the 3D video therein, is inputted from the reproduce apparatus, transmits a message for stopping reproduction of the 3D content and a message for suppressing the output of the message for prompting the preparation of the viewing/listening of the 3D video, to the reproduce apparatus, and presents the message for prompting the preparation of the viewing/listening of the 3D video, when receiving an instruction of reproducing the 3D content from a user, transmits a message for reproducing the 3D content to the reproduce apparatus, and is the reproduce apparatus, when receiving the message for stopping the reproduction of the 3D content, stops the reproduction of the 3D content, and when receiving the message for reproducing the 3D content, reproduces the 3D content, without outputting the message for prompting the preparation of the viewing/listening of the 3D video, and thereby to output, whereby the video signal reproduce apparatus to be connected with display apparatuses of various kinds of display methods starts reproducing of the 3D content, while preventing a display for confirming completion of preparation for viewing/listening of a user from being outputted in duplicate or by a plural number of times.

12 Claims, 6 Drawing Sheets

(51) Int. Cl.
*H04N 9/80* (2006.01)
*H04N 5/93* (2006.01)
*H04N 13/00* (2006.01)
*H04N 13/04* (2006.01)

(56) References Cited

U.S. PATENT DOCUMENTS

| | | | |
|---|---|---|---|
| 2011/0122127 A1* | 5/2011 | Ko et al. | 345/419 |
| 2011/0234586 A1* | 9/2011 | Aoki | 345/419 |
| 2012/0033044 A1 | 2/2012 | Kabuto | |
| 2012/0050508 A1* | 3/2012 | Lee | 348/56 |
| 2012/0287235 A1* | 11/2012 | Ahn et al. | 348/43 |
| 2013/0002839 A1* | 1/2013 | Pennisi et al. | 348/58 |

FOREIGN PATENT DOCUMENTS

| | | |
|---|---|---|
| JP | 2010-245648 A | 10/2010 |
| JP | 2010-276721 A | 12/2010 |
| JP | 2012-39338 A | 2/2012 |
| WO | 2009/090868 A | 7/2009 |

* cited by examiner

| Opcode | Parameters | Parameter description | Response |
|---|---|---|---|
| <Activate 3D display> | [3D activate] | The requested display mode | <Report 3D display> |
| <Report 3D display> | [3D mode] | The current display mode | - |

FIG. 4

| Name | Range Description | | Length | Purpose |
|---|---|---|---|---|
| [3D activate] | "2D" | 0 | 1 byte | Set 2D display mode |
| | "3D" | 1 | | Set 3D display mode |
| | "No change" | 3 | | A source wants to know the TV status. |
| [3D mode] | [3D Glass] [Multi View] [3D setting] [3D Error] | | 1 byte | |
| [3D Msg] | "Not need 3D Msg" | 0 | 1 bit | Not need 3D Message |
| | "Need 3D Msg" | 1 | | Need 3D Message |
| [Multi View] | (The number of multi view) -2 | | 4 bits | Stereoscopic display takes "0". It takes "15" when display has 17 or more view. |
| [3D setting] | "2D" | 0 | 1 bit | Display at 2D mode |
| | "3D" | 1 | | Display at 3D mode |
| [3D Error] | "No error" | 0 | 2 bits | Continue 3D video |
| | "Wait" | 1 | | Wait to play 3D contents till the reception of "No error". ex. TV is encouraging an user to put on glasses. |
| | "no 3D video" | 2 | | No 3D video detected |
| | "Other error" | 3 | | |

DISPLAY APPARATUS

DISPLAY APPARATUS

VIDEO DISPLAY SYSTEM, DISPLAY APPARATUS, AND DISPLAY METHOD

TECHNICAL FIELD

The technical field of this relates transmission of a video signal.

BACKGROUND OF THE INVENTION

In the following Patent Document 1 is disclosed, for dissolving a problem "for the user to enjoy the video, which is displayed in 2D manner, and the video, which is displayed in 3D manner, respectively, from a beginning" (see [0010] of the Patent Document 1), "comprising: a display means, being exchangeable between 2D display and 3D display, a determining means for determining if application data to be displayed on said display means is video for use of the 2D display or video data for use of the 3D display, and a control means for displaying a result of determination made by said determining means on said display means before displaying said application data on said display means" (see [0010] of the Patent Document 1), as a means for dissolving that.

PRIOR ART DOCUMENTS

Patent Documents

Patent Document 1: Japanese Patent Laying-Open No. 2003-333624 (2003).

BRIEF SUMMARY OF THE INVENTION

Problem(s) to be Solved by the Invention

In the Patent Document 1, as is described therein that there are "as a method for conducting the 3D display, . . . a method for enabling the 3D view with applying special glasses, or . . . a parallax barrier method and/or a lenticular lens method for enabling the 3D view through naked eyes", and that "for the user, to obtain the 3D view of the video, which is displayed in the 3D display, it is necessary to wear the special glasses for use of 3D observation, or to do an appropriate action, such as, adjusting a position for observation in such a manner that the video displayed in the 3D display can be viewed in 3D", in order to view/hear the video displayed, appropriately, there is necessity of adjustments depending on the methods of the 3D displays, respectively.

Herein, in the Patent Document 1, since it is targeted to that combining a 3D display apparatus, such as, "electronic recording/reproducing equipment attached with a display device, for enabling to record and/or reproduce the 3D video, etc." and a video signal reproduce apparatus in one (1) body, then the 3D display method of the 3D display apparatus is determined in advance. Therefore, the video signal reproduce apparatus has such structure that it displays only matters to be attended to relating to the 3D display, which are determined in advance, regarding the matters to be attended relating to viewing/hearing of the video to be displayed in 3D.

However, in case where the 3D display apparatus and the video signal reproduce apparatus are separated from, the video signal reproduce apparatus cannot identify a 3D display method of the display device to be connected with, and then it results to display the similar matters to be attended relating to viewing/hearing, in duplicate, supplied from the video reproduce apparatus, in spite of the fact that is shows a guidance display relating to the 3D display, such as, the matters to be attended relating to viewing/hearing of the video to be displayed in 3D, on the 3D display apparatus, i.e., bringing about cases where the displays are duplicated so that they are difficult to be seen, and where an operation for agreeing with the guidance must be conducted two (2) times.

Also, there is paid no consideration upon a process depending on using situation of the user.

Means for Solving the Problem(s)

For dissolving the problem(s) mentioned above, according to the present invention, for example, there are provided a video display system, a display apparatus, and a display method, having such constituent elements as described in the pending claims, which will be mentioned below.

Thus, the present invention, although including therein plural numbers of the means for dissolving the problem (s) mentioned above, and if picking up one example, there is provided a video display system, having a reproduce apparatus, which is configured to reproduce content, thereby to output, and a display apparatus, which is configured to display the content outputted from said reproduce apparatus, wherein said display apparatus, when being inputted therein a 3D content, including the 3D video therein, is inputted from said reproduce apparatus, transmits a message for stopping reproduction of said 3D content and a message for suppressing the output of the message for prompting the preparation of the viewing/listening of the 3D video, to said reproduce apparatus, and presents the message for prompting the preparation of the viewing/listening of the 3D video, when receiving an instruction of reproduce said 3D content from a user, transmits a message for reproducing said 3D content to said reproduce apparatus, and said reproduce apparatus, when receiving the message for stopping the reproduction of said 3D content, stops the reproduction of said 3D content, and when receiving the message for reproducing said 3D content, reproduces said 3D content, without outputting the message for prompting the preparation of the viewing/listening of the 3D video, and thereby to output.

Effect(s) of the Invention

In accordance with such present invention as was mentioned above, it is possible to prompt appropriate viewing/listening of 3D content, and thereby possible to provide an apparatus, having a good usability for the user.

EMBODIMENT(S) FOR CARRYING OUT THE INVENTION

Hereinafter, explanation will be given on embodiments. In those embodiments, which will be mentioned hereinafter, "3D" means a three (3) dimension, and "2D" a two (2) dimension, respectively. For example, a "3D dimensional vide" means a video for enabling an observer to sense a certain object lying in the space same to that where she¥he lies herself/himself, in the 3D manner, by presenting videos having the parallax therebetween to the left and the right eyes. Also, for example, a "3D display apparatus" means a display apparatus for enabling to display the 3D video thereon. And also, for example, a "3D content" means a content containing therein a video signal, which enables to display the 3D video through a process by the 3D display apparatus.

Embodiment 1

Figure 1:
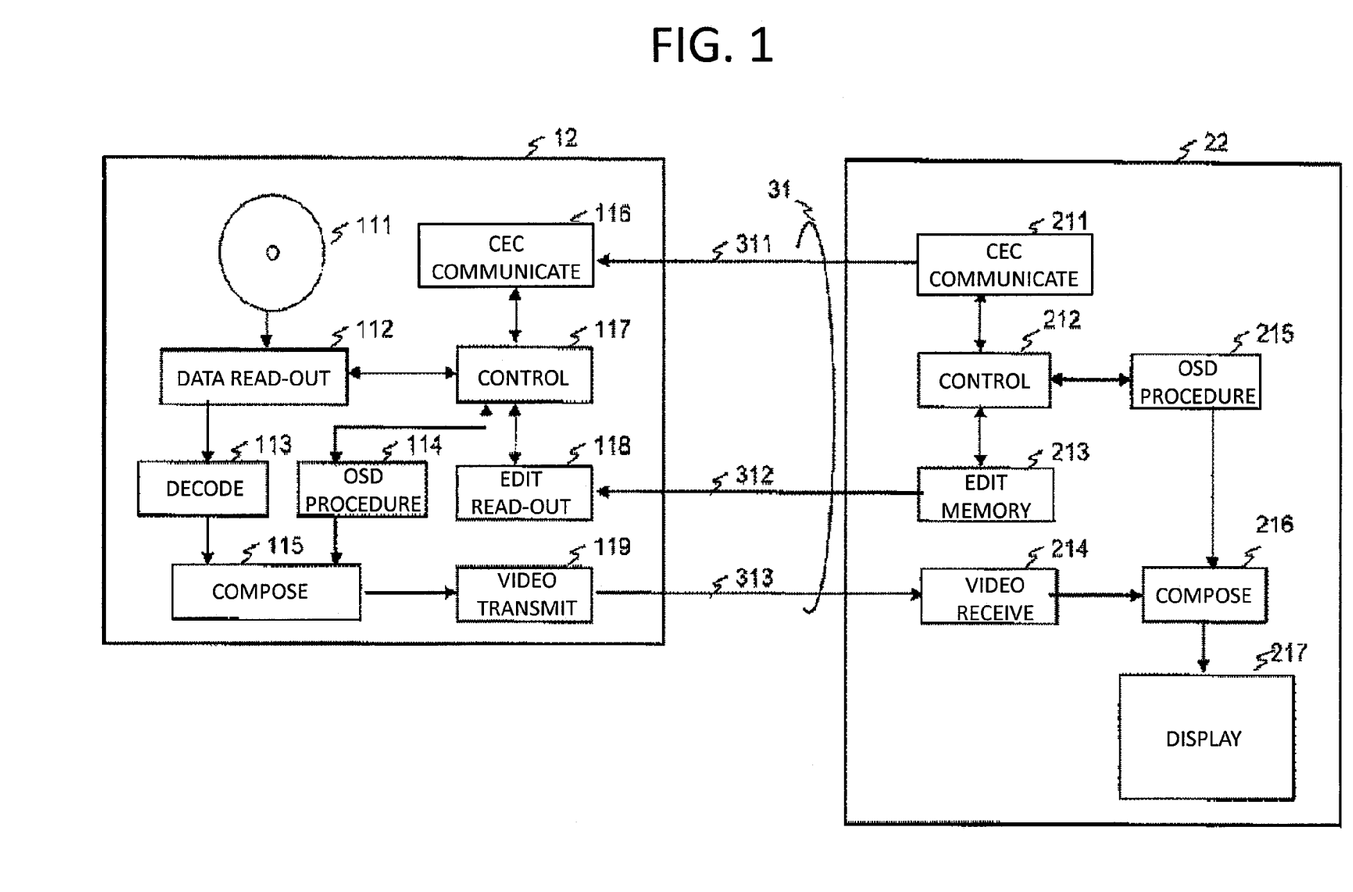
FIG. 1 is a block diagram for showing an example of a video system, according to the present invention.

FIG. 1 is a block diagram for showing a video transmitting system according to the present invention, wherein a video signal reproduce apparatus 12 is connected with a 3D display apparatus 22 through a HDMI (i.e., an abbreviation of High-Definition Multimedia Interface: 10). The video signal reproduce apparatus 12 may be, for example, a DVD player, a DVD recorder, a Blu-ray Disc®) player, a Blu-ray Disc recorder, or a HDD recorder, etc., and it may comprises a recording medium 111, such as, an optical disc or a magnetic recording disc or a semiconductor memory, etc., a data read-out portion 112, a decode portion 113, an OSD (On Screen Display) produce portion 114, a video signal compose portion 115, a CEC (Consumer Electronics Control) communicate portion 116, a control portion 117, an EDID (Extended Display Identification Data) read-out portion 118 and a video transmit portion 119. However, the recording medium 111 may be built within the video signal reproduce apparatus 12 or may be made detachable.

In the video signal reproduce apparatus 12, the video data, which is read out by the data read-out portion 112 from the recording medium 111, is decoded within the decode portion 113. The video data decoded is composed with OSD, which is produced in the OSD produce portion 114, depending on the necessity thereof, within the video signal compose portion 115, and is outputted from the video transmit portion 119.

The 3D display apparatus 22 is such a display that it can display the 3D video thereon, and for example, it may be a display apparatus, including therein a liquid crystal display, a plasma display, or an organic EL display, etc.

The 3D display apparatus 22 comprises a CEC communicate portion 211, an EDID memory portion 213, a video receive portion 214, an OSD produce portion 215, a video signal compose portion 216 and a display portion 217. However, it may have the structure of including therein a tuner, a descrambler, a demultiplexer, a decoder, etc., for processing an airwave, which is received by an antenna.

In the 3D display apparatus 22, the video data, which is received by the video receive portion 214, is displayed on the display portion 217. Also, it is possible to display the OSD video, which is produced within the OSD produce portion 215, after being composed with the video data, which is received by the video receive portion 214, within the video signal compose portion 216.

As a method for the 3D display apparatus 22 to display the 3D video, there are already known various methods, such as, an anaglyph method, a polarization display method, a frame/sequential method, a parallax barrier method, a lenticular lens method, a micro-lens array method, a light ray reproduce method, etc.

The anaglyph method is a method for reproducing the videos, which are photographed at angles different from each other, from the left and the right, through piling up red and blue lights thereon, respectively, and thereby to be seen through glasses, which are attached with red and blue filters on the left and the right (hereinafter, also being called "anaglyph glasses").

The polarization display method is a method of projecting the videos on the left side and the right side, while applying linear polarizations on them, being perpendicular to each other, and this is separated by seeing through glasses attached with polarization filters thereon (hereinafter, also being called "polarization glasses").

The frame/sequential method is a method for reproducing the videos, alternately, which are photographed at angles different from each other, from the left and the right, and to be seen through glasses, which are attached with liquid crystal shutters for shutting off the fields of views at the left and the right, alternately (hereinafter, also being called "shutter glasses").

The parallax barrier method is a method of putting a barrier of vertical stripes, which is called by a "parallax barrier" on the display, so that the video for the right-side eye is shown to the right-side eye while the video for the left-side eye to the left-side eye, and there is no necessity for the user to wear special glasses, etc. The parallax barrier method can be classified, further, into a 2 viewpoints method, being relatively narrow of the position for viewing, and a multi-viewpoints method, being relatively wide of the position for viewing, and so on.

The lenticular lens method is a method of letting the video for the right-side eye to the right-side eye and the video for the left-side eye to the left-side eye, respectively, by piling up a lenticular lens on the display, and there is no necessity for the user to wear special glasses, etc. The lenticular lens method can be classified, further, into a 2 viewpoints method, being relatively narrow of the position for viewing, and a multi-viewpoints method, being relatively wide of the position for viewing, in the horizontal direction, and so on.

The micro-lens array method is a method of letting the video for the right-side eye to the right-side eye and the video for the left-side eye to the left-side eye, respectively, by piling up a micro-lens on the display, and there is no necessity for the user to wear special glasses, etc. The micro-lens array method is a multi-viewpoints method, being relatively wide of the position for viewing, in the horizontal and the vertical directions.

The light ray reproduce method is a method of parallax videos to the observer, by reproducing a wave surface of the light ray, and there is no necessity for the user to wear special glasses, etc. Also, the position for viewing thereof is also relatively wide.

However, the display methods for the 3D video are only examples thereof, and there may be applied a method (s) other than those mentioned above. Also, the tool (s) and/or the apparatus (es) necessary for viewing the 3D video, such as, the anaglyph glasses, the polarization glasses and the shutter glasses, etc., are also called, a "3D glasses", a "3D view/listen apparatus" or a "3D viewing/listening auxiliary equipment", collectively.

A HDMI cable 31 has a CEC line 311 and a DDC (Display Data Channel) line 312, and a TMDS (Transition Minimized Differential Signaling) line 313.

The "HDMI" and the "High-Definition Multimedia Interface" are registered trademarks of HDMI Licensing LLC, and are one of digital interfaces for video/audio signals. The "CEC" is for providing a function of conducting a control between the video equipments by means of an interactive (or two-way) communication, which the HDMI has. The "EDID" is a format of description data, for indicating a receiving/displaying power or capacity of the display apparatus, which is formulated by VESA (Video Electronics Standards Association), and is applied by the HDMI. Hereinafter, although the explanation will be given, by taking the HDMI as an example thereof, but it can be achieved in other video digital interface, in the similar manner.

Hereinafter, explanation will be given on an embodiment of provision of a guidance display or guidance voices, being more precise and plainly understandable to the user, wherein the video signal reproduce apparatus 12 instructs the 3D display apparatus 22 to display the 3D video thereon, while the 3D display apparatus 22 transmits a present condition of displaying the 3D video, on a real time basis, to the video signal reproduce apparatus 12.

Figure 2:
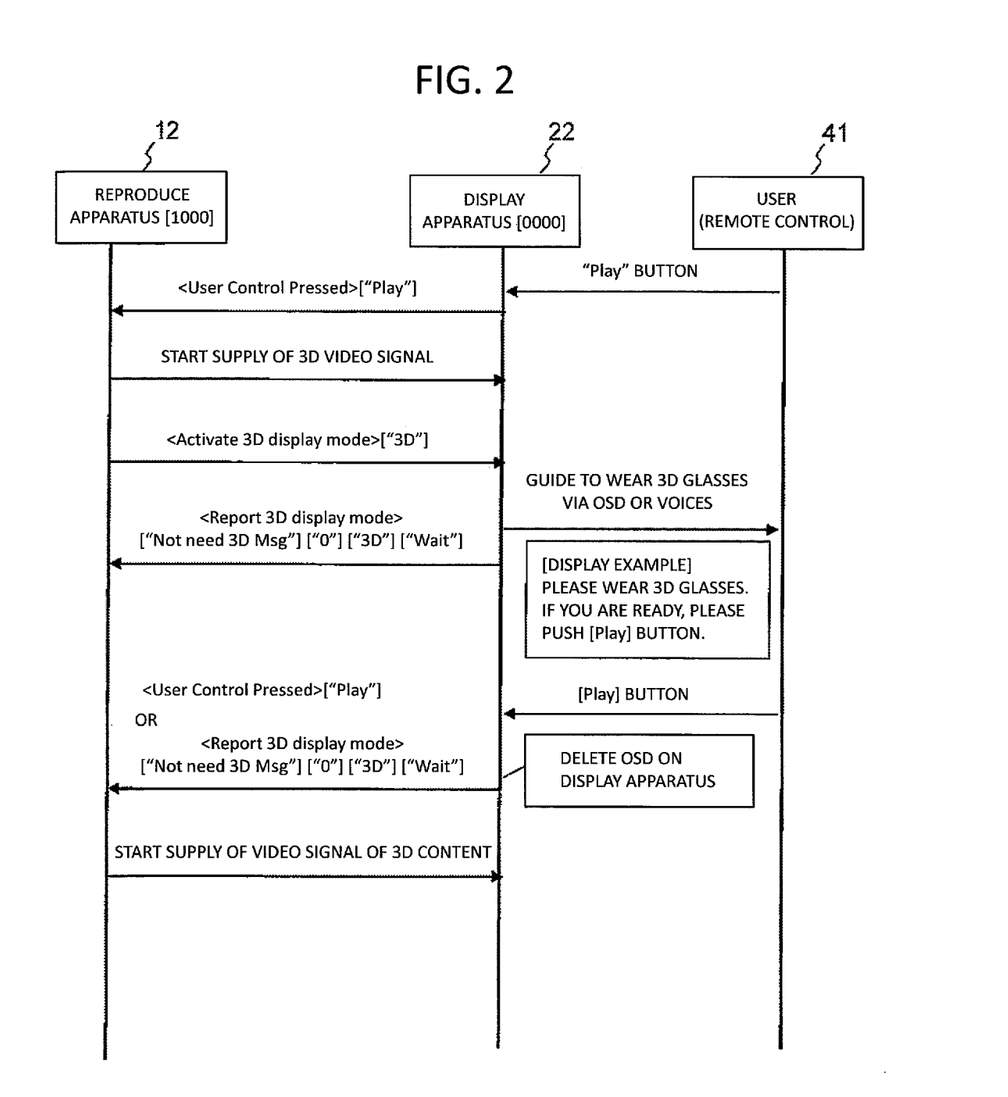
FIG. 2 is a view for showing an example of transmission of messages in the video system mentioned above.
Figure 3:
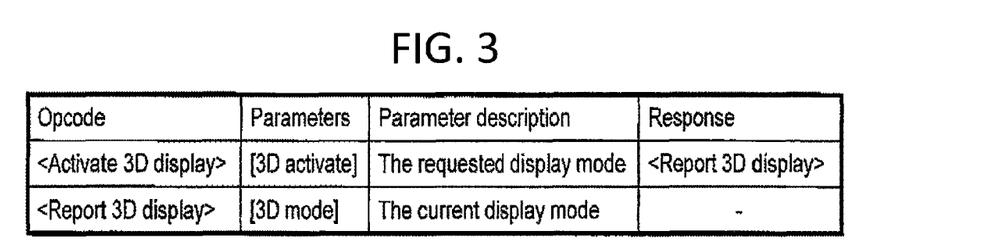
FIG. 3 is a table for showing an example of the messages in the video system mentioned above.
Figure 4:
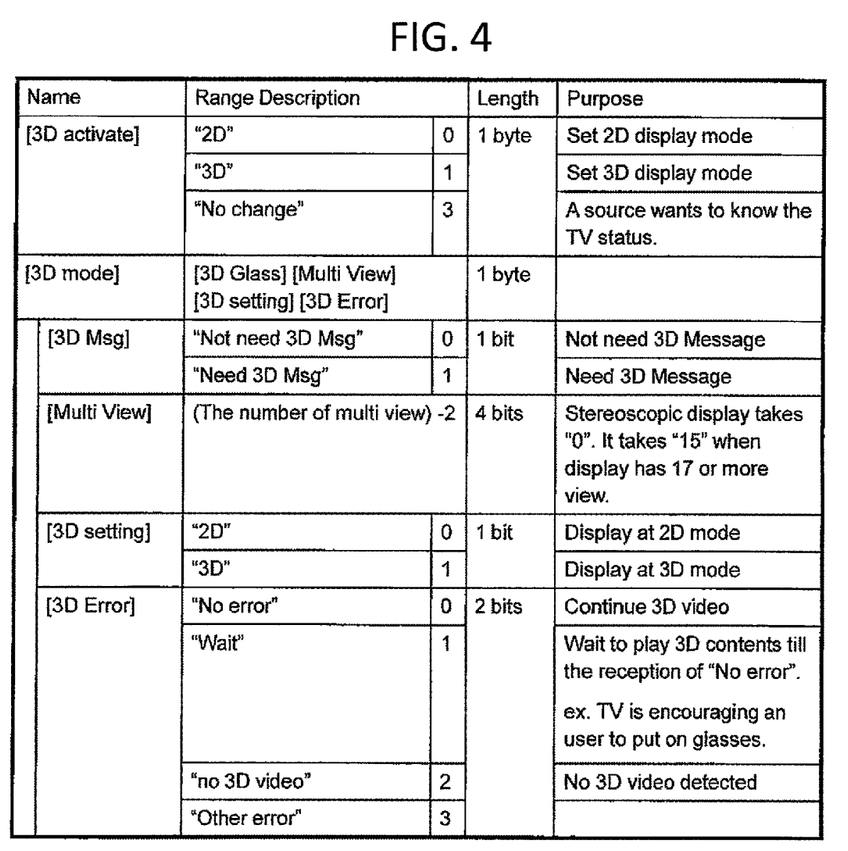
FIG. 4 is a table for showing an example of arguments of the messages in the video system mentioned above.

FIG. 3 shows an example of messages to be added newly to the CEC, and FIG. 4 shows an example of definitions of arguments of those messages, respectively. Hereinafter, explanation will be given on the operation of the present embodiment, by referring to an example of transmission of the message shown in FIG. 2.

When a user 41 pushes down a [play] button (i.e., being a button for indicating reproduction of content, and may be called, a reproduce button, too) on the remote controller of the display apparatus 22, then the control portion 212 of the display apparatus 22, upon receipt of an infrared light thereof, controls the CEC communicate portion 211 to transmit a remote controller code [play] to the video signal reproduce apparatus 12, in the form of a message, <User Control Pressed>["Play"], via the CEC line 311 of the HDMI cable 31. Herein, < > indicates a command code, while [ ] an argument thereof, and this message is a standard message of HDMI.

When the CEC communicate portion 116 of the video signal reproduce apparatus 12 receives that message, then the control portion 117 control each of blocks, i.e., the data readout portion 112 reads out the video data of an introductory portion of the 3D content from the recording medium 111, while the decode portion 113 decodes it into a 3D video signal, and a video signal of 3D format is outputted from the video transmit portion 119 onto the TMDS line 313 of the HDMI cable 31 via the video signal compose portion 115.

Or, the OSD produce portion 114 may produce the 3D video signal, thereby to output the video signal of the 3D format onto the TMDS line 313 of the HDMI cable 31, from the video transmit portion 119, via the video signal compose portion 115.

After receipt of this video signal of the 3D format upon the video receive portion 214 thereof, the 3D display apparatus 22 displays it on the display portion 217 via the video signal compose portion. This display is variable depending on a user setup of the 3D display apparatus or designing of a manufacturer of the display apparatus, i.e., a condition of displaying the 2D video (i.e., a 2D display condition) should be continued, or should be automatically changed into a condition of displaying the 3D video (i.e., a 3D display condition), etc., when the 3D display apparatus receives the video signal of the 3D format. In the present embodiment may be applied either one of those methods.

The video signal reproduce apparatus 12, upon starting of an output of the video signal of the 3D format, transmits a message, to <Activate 3D display mode>["3D"], for requesting the 3D display apparatus to be set into the 3D display condition, to the 3D display apparatus 22. This message applies a command code and an argument according to the present invention, which are defined in FIGS. 3 and 4.

The 3D display apparatus 22, which is requested to be set into the 3D display condition, although a guidance display or guidance voices to the user may be omitted if it is already in the 3D display condition, provides the guidance display and/or the guidance voices, such as, "Please wear 3D glasses", etc., for example, to the user 41, when it is changed from the 2D display condition.

In case of the guidance display, after being produced within the OSD produce portion 215, the video for use of the guidance display is composed with the video signal, which is inputted from the video signal reproduce apparatus 12 by means of the video signal compose portion 216, and is displayed on the display portion 217. In case of the guidance voices, though not shown in the figure, the voices, which are produce in an audio produce portion, or the voices, which are recorded in the apparatus in advance, are reproduced through a speaker (s). However, in the embodiment, which will be mentioned hereinafter, the messages to the user of the guidance display and/or the guidance voices may be expressed, collectively, by "guidance display or the like", or may be expressed by only "guidance".

The 3D display apparatus 22, in addition to providing the guidance display or the like to the user, is also able to output a message (["Not need 3D Msg"]), indicating that the guidance display or the like is unnecessary, to the video signal reproduce apparatus 12; in the form of <Report 3D display mode>, so that the guidance display or the like, such as, matters to be attended to or the like, in relation to the viewing/listening, etc., for example, will not be presented, in duplicate, both the guidance display or the like from the 3D display apparatus 22 and the guidance display or the like from the video signal reproduce apparatus 12, or not presented continuously by plural numbers of times. And, it is also able to output a message (["Wait"]), indicating a waiting of reproduction of the 3D content, to the video signal reproduce apparatus 12, in the form of <Report 3D display mode>, for the purpose of maintaining a preparation time-period for the user to view/listen the 3D video, such as, wearing of the 3D glasses, etc. For example, in case where the guidance display or the like from the video signal reproduce apparatus 12 is unnecessary, and when the user wishes to keep a time for preparation of viewing/listening the 3D video, then a message, <Report 3D display mode> ["Not need 3D Msg"] ["0"] ["3D"] ["Wait"], is responded from the 3D display apparatus to the video signal reproduce apparatus 12. This message also applies the command code and the argument according to the present invention, which are defined in FIGS. 3 and 4.

The video signal reproduce apparatus 12 waits, but not staring the reproduction of the 3D content, or waits while displaying a still picture of an introductory portion of the 3D content or displaying it repetitively, but not outputting the matters to be attended to, in relation with the viewing/listening, in relation to the viewing/listening when reproducing.

When the user 41 is ready to view/listen the 3D video, i.e., putting on the 3D glasses, etc., the user 41 pushes down [Play] on the remote controller. The display apparatus 22, upon receipt of the infrared light thereof, stops the guidance display or the like, and transmits a remote controller code [Play] to the video signal reproduce apparatus 12, in the form of message, <User Control Pressed>["Play"], and the video signal reproduce apparatus 12 starts reproduction of the 3D content, while omitting a process for outputting the matters to be attended to, in relation with the viewing/listening, in relation to the viewing/listening when reproducing, thereby to output the 3D video signal to the 3D display apparatus 22.

However, in case where the 3D display apparatus 22 makes a guidance to push down a predetermined button, such as, [determine], for example, i.e., a button other than the [Play] button, the button to be pushed down by the user 41, when the preparation for the 3D viewing/listening is ready, may be a button in accordance with that guidance.

Also, in the place of the message, <User Control Pressed> ["Play"], a message, <Report 3D display mode>["Not need 3D Msg"] ["0"] ["3D"] ["No Error"] may be transmitted.

The method mentioned above, though being explained by taking the 3D display apparatus of a method necessitating the 3D glasses therein; however, it is also applicable into a display apparatus, which applies other display method of the 3D video. For example, in case of a naked-eye type not necessitating the 3D glasses, such as, the lenticular lens method, etc., a guidance display or guidance voices may be made, notifying a fact that a region of viewing/listening is narrow, and thereby prompting to move to a position, from where the 3D display can be seen favorably, in the place of the display of the guidance for prompting to wear the 3D glasses.

Also, with the 3D display apparatus exchangeable between 2D/3D display, it may be so constructed that a fact is notified, of being set into the 2D display condition, through setup made by the user, and then the guidance display or the like may be made for prompting exchange into the 3D display condition. In this instance, in case where the user is dare to select continuation of the 2D display condition, <Report 3D display mode>["Not need 3DMsg"] ["0"] ["3D"] ["NoError"] may be transmitted, while keeping the 3D display apparatus in the 2D display condition, thereby to request the 3D video signal. This is because, although possible to transmit <Report 3D display mode>["Not need 3D Msg"] ["0"] ["2D"] ["No Error"]; however, in this case, there is a possibility that an output of the 3D video is cancelled, if the 3D content has a flag for inhibiting the 2D display condition.

According to the present embodiment, since the 3D display apparatus itself can grasp the method of 3D display of that 3D display apparatus and/or the present condition of exchanging between 2D/3D, it is possible to provide an appropriate guidance display to the user, and thereby to achieve the 3D display apparatus, being superior in the usability thereof for the user, even with the 3D display apparatus applying the naked-eye method therein, and/or in the 3D display apparatus enabling a display while exchanging between 2D/3D.

Also, since a condition of preparation for viewing/listening the 3D video by the user of the 3D display apparatus can be grasped on the video signal reproduce apparatus, there can be brought about a merit that a preparation of reproduction of the content can be made, being appropriate much more than on the video signal reproduce apparatus.

Heretofore, although the explanation was given on the CEC communicate message of the HDMI, by taking it as an example; however, similar operations and effects can be expected, if using a communication message via Ether Net (registered trademark) channel, which is defined by the HDMI. With applying this Ether Net channel, communication can be made in a time-period, being short comparing to CEC, and it is possible to build up a 3D system, being superior in the responsibility in exchange between 2D/3D.

In the present embodiment, although the explanation was given by taking the reproduction of content of the recording medium, as an example; however, a similar effect can be obtained, even when reproducing the content with applying other method therein, such as, when reproducing the content of 3D lying on a network, etc., with applying the Ether Net channel, which is defined by the HDMI.

Embodiment 2

Figure 5:
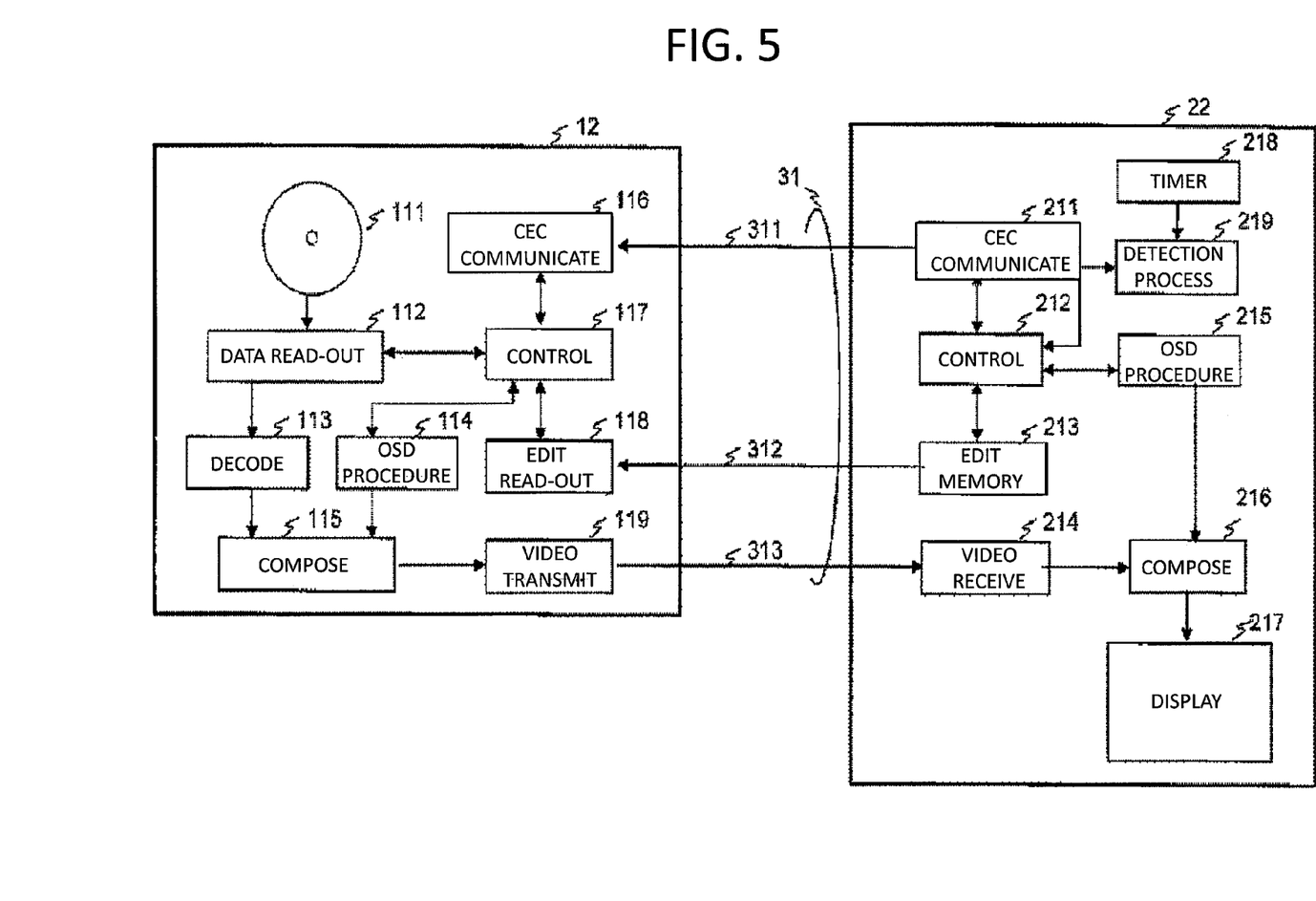
FIG. 5 is a block diagram for showing other example of a video system, according to the present invention.

FIG. 5 is a block diagram for showing a second embodiment. Portions having the same functions to those of the block diagram shown in FIG. 1 are attached with the same reference numerals. Portions differing from those shown in FIG. 1 include a timer 218 for measuring a time-period, and a detection process portion 219.

The timer 218 measures a time or a count number, and thereby measuring an elapsed time-period. The detection process portion 219 has a mechanism of detecting an operation signal of the remote controller, and measuring a history of operations and a time-period from an operation to a next operation by the timer 218, and thereby controlling the control portion 212 depending on the time-period.

For example, it is the mechanism of detecting contents of the operation and a time-period of operation, when the user changes the setup of the display apparatus 22 from the 3D display to the 2D display, and further conduct an operation for changing to the 3D display, and of controlling the control portion 212 depending on the contents of that operation and the time-period thereof.

The guidance display or the like for prompting the wear of the 3D glasses is troublesome to the user if it is displayed when she/he is wearing the 3D glasses. Then, it is so constructed that the timer 218 measures the time when the 2D video is displayed, for example, when the user stops, temporality, during the time when she/he is viewing/listening the reproduction of the 3D, to change the display portion 217 to the 2D display, and thereby changes into the 3D display, again, and if detecting that the time is a predetermined time (for example, within one (1) minute), the detection process portion 219 determines that the user is still on the way of wearing the 3D glasses, so as not to display the guidance display or the like, for prompting the wear of the 3D glasses, when the 3D video is displayed again.

With such structure, it is possible to avoid the repetitive guidance display or the like, which is troublesome to the user. Further, the 3D display apparatus is also able to prevent the guidance for use of wearing the 3D glasses, from being displayed, also from the video signal reproduce apparatus 12, by transmitting <Report 3D display mode>["Not need 3D Msg"] ["0"] ["3D"] ["No Error"].

In this manner, when the user conducts operations for exchanging between the 2D display and the 3D display, in a short time, it is possible to increase the usability for the user, by not doing the guidance display or the like, for prompting the wear of the 3D glasses, repetitively.

For example, this is effective when the user wishes to view/listen two (2) input signals of the 2D and the 3D, while zapping them in a short time-period.

Also, while the timer 218 measures the time during when the display apparatus is displaying the 3D video, continuously, when the detection process portion 219 detects that it exceeds a predetermined time, 3 hours, for example, then it is also possible to conduct the guidance display or the like for warning a long time 3D viewing/listening to the user. Also, with outputting <Report 3D display mode>["Need 3D Msg"] ["0"] ["3D"] ["No Error"] from the display apparatus to the video signal reproduce apparatus, it is possible to get the video signal reproduce apparatus to output the guidance display or the like in relation to the 3D viewing/listening. Also, with transmitting <Report 3D display mode>["Need 3D Msg"] ["0"] ["2D"] ["No Error"] from the display apparatus to the video signal reproduce apparatus, a request may be made for changing the setup of the display apparatus to the 2D display, automatically. In this instance, before detecting the input video signal changing from the 3D to the 2D, the display apparatus may be changed to a 2D display mode, and the face of that changing may be displayed on the display portion.

The detection process portion 219 may have a function of detecting a time-period of absence of a person and/or a viewing/listening condition within a detection area, a number of viewers/listeners, and discrimination of viewers/listeners, etc., not limiting to the operation of the remote controller, but by means of a human sensor, a camera sensor, or a microphone sensor, etc. With the detection process portion 219, if being in the configuration, including therein the human sensor, the camera sensor, or the microphone sensor, etc., it is possible to detect the presence of a person, upon basis of a result of detection of the sensor, i.e., a presence/absence of detection of a movement of a person or a face thereof, or a sound (or, a noise) within the detection area of the sensor.

Or, the structure may be made so that the display portion 217 may be changed to the 2D display, or to a mode for energy saving to reduce or put out a backlight or a light emission of the display portion, at timing when detection is made on the absence of a person by the detection process portion 219, under the condition of 3D display of the display portion 217. In harmony with that, the measurement of time is started by the timer 218, and the measurement is made of the time-period until timing when a presence of a person is detected by the detection process portion 219, again (i.e., an absent time-period).

Further, the display apparatus 22 transmits a fact of being changed to the energy saving mode, to the video signal reproduce apparatus, by the message <Report 3D display mode> ["Need 3D Msg"] ["0"] ["2D"] ["Wait"] or <Report 3D display mode>["Need 3D Msg"] ["0"] ["3D"] ["Wait"], and the video signal reproduce apparatus 12 stops, temporarily.

In case where the time-period of absence is equal to or less than a predetermined time (for example, equal to or less than 1 minute), and where the user changes the display apparatus 22 to the 3D display, again, or where the display apparatus 22 automatically changes to the display mode of 3D, the message, <Report 3D display mode>["Need 3D Msg"] ["0"] ["3D"] ["No Error"] is transmitted.

In this case, with determining that the user is still putting on the 3D glasses, or that the user still remembers the guidance for wearing the 3D glasses, it is possible to avoid the troublesome repetitive display of the guidance, without displaying the re-guidance for wearing the 3D glasses when displaying the 3D again. In case where the time-period of absence is longer than the predetermined time, it is also possible to conduct the guidance for wearing the 3D glasses, by transmitting <Report 3D display mode>["Need 3D Msg"] ["0"] ["3D"] ["No Error"]. Or, it is also possible to conduct the guidance for wearing the 3D glasses on the display apparatus, by <Report 3D display mode>["Not need 3D Msg"] ["0"] ["3D"] ["No Error"].

An example will be shown where the viewing/listening condition of the user is detected by the camera sensor, within the detection process portion 219. Detection is made on a condition, such as, the user is sprawling on or the like, for example, by the camera sensor, and an angle is detected of the 3D glasses, with respect to the display apparatus, such as, "0" shown in FIGS. 6A and 6B, by means of image recognition processing. For example, by means of the image recognition processing for recognizing characteristics of a color and/or a shape of the 3D glasses, after recognizing the 3D glasses, a difference (θ) of the angle is calculated out, comparing to the case where the 3D glasses face to a front surface of the display apparatus, straightforwardly, which is stored in a memory in an inside of the 3D display apparatus 22.

Figure 6A:
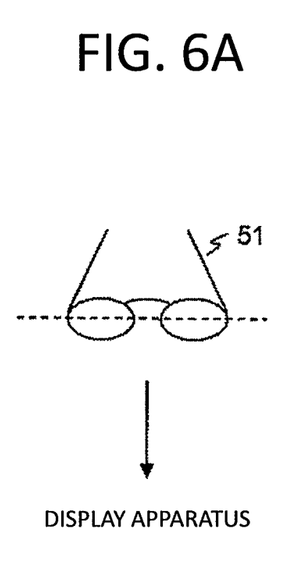
FIGS. 6A and 6B are an image view for showing an angle of 3D glasses in the video system mentioned above.
Figure 6B:
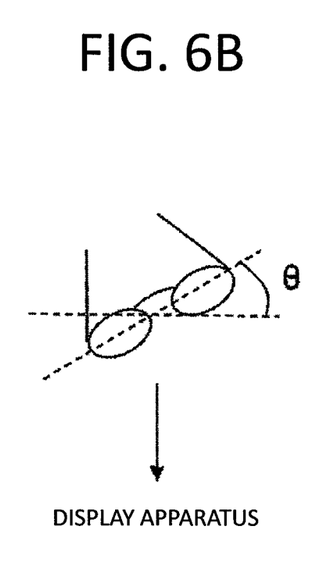

In case where θ is equal to zero (0) degree, since the 3D glasses is in the condition of facing to the front surface of the display apparatus, straightforwardly, it is easy for the user to fuse a stereo-image (e.g., a 3D image) from the video for the left-side eye and the video for the right-side eye. However, as θ comes to be large from zero (0) degree, the left-side eye and the video for the right-side eye do not enter into the left-side eye and the right-side eye, and this brings about a condition, in which it is difficult to fuse the stereo-image. In case where the determination is made that θ is equal to the predetermined angle or greater than that, it is possible to get the video signal reproduce apparatus 12 to output the guidance for wearing the 3D glasses or an attention, by transmitting <Report 3D display mode>["Need 3D Msg"] ["0"] ["3D"] ["No Error"].

Or, it may be possible to change to the 2D display, after getting the video signal reproduce apparatus 12 to output the guidance for wearing the 3D glasses or the attention, by transmitting <Report 3D display mode>["Need 3D Msg"] ["0"] ["2D"] ["No Error"].

Or, it is also possible to gent the display apparatus to conduct the guidance in relation to the 3D glasses (i.e., a message for prompting a revision of the angle of the 3D glasses or a posture of the user for viewing/listening, etc.), by transmitting <Report 3D display mode>["Not need 3D Msg"] ["0"] ["3D"] ["No Error"].

Or, it may be possible to conduct a guidance to change the video displayed on the display apparatus to the 2D, by transmitting <Report 3D display mode>["Not need 3D Msg"] ["0"] ["2D"] ["No Error"].

Also, when continuing the 3D display, a message, being added with the value of θ as an argument, is transmitted from the display apparatus 22 to the video signal reproduce apparatus 12, so as to bring the video signal reproduce apparatus 12 to output the 3D video signal, which is adjusted fitting to the present angle of the 3D glasses, thereby providing a most suitable video display to the user.

Also, when the display apparatus is in the condition of the 3D display, and if detection is made of no wearing of the 3D glasses, upon detection of the presence/absence of wearing the 3D glasses by the viewer/listen through the image recognition processing, from the picture obtained by the camera sensor, then it is also possible to conduct the guidance for wearing the 3D glasses, by transmitting <Report 3D display mode>["Need 3D Msg"] ["0"] ["3D"] ["No Error"], or alternately, for the display apparatus to do the similar guidance, by transmitting <Report 3D display mode>["No need 3D Msg"] ["0"] ["3D"] ["No Error"].

And, with applying the function of face detection of the camera sensor within the detection process portion 219, if the detected number of the face (s) does not agree with the detected number of the 3D glasses, it is also possible to conduct the guidance for wearing the 3D glasses, by transmitting <Report 3D display mode>["Need 3D Msg"] ["0"] ["3D"] ["No Error"], or alternately, for the display apparatus to do the similar guidance, by transmitting <Report 3D display mode>["No need 3D Msg"] ["0"] ["3D"] ["No Error"].

Next, explanation will be given on an example of discriminating the viewer/listener, upon basis of the face detecting function of the camera sensor and/or steps of operations made on the remote controller, etc., within the detection process portion 219. There can be considered the following methods: for example, a method for discriminating the viewer/listener, by photographing a face of the viewer/listener by the camera, so as to make a matching to face video data, which is registered in advance, and thereby identifying that person, and a method for discriminating the viewer/listener, by pushing down a button of the user, while providing such button for discriminating the user on the remote controller, etc.

In case where discrimination is made on the viewer/listener, with those methods, and if detecting that the viewer/listener is a child of 6 years old or elder than that, it is possible to display an attention upon the 3D viewing/listening, i.e., not allowing the viewer/listener of the predetermined ages or elder than that to view/listen the 3D, by transmitting <Report 3D display mode>["Need 3D Msg"] ["0"] ["3D"] ["No Error"], continuously, or alternately, for the display apparatus to do the similar guidance, by transmitting <Report 3D display mode>["No need 3D Msg"] ["0"] ["3D"] ["No Error"].

Also, it may be possible to change into the video signal for use of the 2D display, compulsively, by transmitting <Report 3D display mode>["No need 3D Msg"] ["0"] ["2D"] ["No Error"]. In this case, it may be made to do a guidance, indicating that the 3D display cannot be made for children on the display apparatus, etc. Also, it may be possible to change into the video signal for use of the 2D display, after the video signal reproduce apparatus conducts the similar guidance, by transmitting <Report 3D display mode>["Need 3D Msg"] ["0"] ["2D"] ["No Error"].

In the embodiment mentioned above, it may be also possible to add a number of times of displaying the guidance and/or a time of display, or a kind or class of the 3D viewing/listening message, etc., to the argument, when getting the video signal reproduce apparatus to conduct the guidance. For example, it is possible to make a control, such as, displaying the message for prompting the wear of the 3D glasses, etc., for one (1) minute.

In case of an example other than that mentioned above, with delivering the arguments of ["Need 3D Msg"] and ["Not need 3D Msg"], it is possible to increase the usability for the user and/or an insurance of safety, by controlling the presence/absence of the guidance display for wearing the 3D glasses, upon basis of a result detected within the detection process portion 219.

Other Embodiment(s)

In the embodiments mentioned above, the explanation was made on the example of controlling the presence/absence of the guidance display for use of wearing the 3D glasses, of the video signal reproduce apparatus 12, by transmitting the message from the 3D display apparatus 22 to the video signal reproduce apparatus 12. In the present embodiment, it may be possible to add the guidance display, by transmitting a message having information of the kind of a content of guidance display to be outputted and a position of displaying thereof as the arguments, from the video signal reproduce apparatus 12 to the 3D display apparatus 22, so as for the 3D to determine the necessity of the guidance display to be added, relating to the 3D display. However, in the place of that message, it may be possible to apply metadata given to the video.

As the kind information of contents of the guidance to be described in the arguments or the metadata are the followings: for example, a general attention for the 3D viewing/listening, an attention not to incline a face when seeing, an attention of avoiding the viewing/listening by a young age parson, an attention of wearing the 3D glasses, and a guidance of a temporal stoppage until completion of preparation the 3D viewing/listening, etc. With the 3D display apparatus 22 noticing the kinds of the guidance display relating to the 3D viewing/listening, which the video signal reproduce apparatus 12, the duplicating guide display can be avoided.

Further, with the display positions of those guidance, adding display position/size information, such as, a center of a screen, positions of up/down and left/right, etc., to the argument and the metadata, since the 3D display apparatus 22 can display an additional attention, not piling up the attention for the 3D viewing/listening, which is outputted by the video signal reproduce apparatus 12, it is also possible to inform the both attentions to the user, with certainty much more.

Explanation of Marks

12 . . . video signal reproduce apparatus, 111 . . . recording medium, 112 . . . data read-out portion, 113 . . . decode portion, 114, 215 . . . OSD produce portion, 115, 216 . . . video signal compose portion, 116, 211 . . . CEC communicate portion, 117, 212 . . . control portion, 118 . . . EDID read-out portion, 119 . . . video transmit portion, 22 . . . 3D display apparatus, 213 . . . EDID memory portion, 214 . . . video receive portion, 217 . . . display portion, 218 . . . timer, 219 . . . detection process portion, 31 . . . HDMI cable, 311 . . . CEC ray, 312 . . . DDC ray, 313 . . . TMDS ray, 41 . . . user, 51 . . . 3D glasses.

What is claimed is:

1. A video display system, having a reproduce apparatus, which is configured to reproduce content, thereby to output, and a display apparatus, which is configured to display the content outputted from said reproduce apparatus, wherein
    said display apparatus transmits a first command message for suppressing an output of a first guidance message for prompting preparation of viewing/listening of a 3D video, to said reproduce apparatus, and presents a second guidance message for prompting the preparation of the viewing/listening of the 3D video, the first guidance message is produced by the reproduce apparatus and the second guidance message is produced by the display apparatus, and
    said reproduce apparatus reproduces said 3D content, without outputting the first guidance message to the display apparatus, and thereby to output.

2. The video display system, as described in the claim 1, wherein
    said display apparatus, when being inputted therein a 3D content, including the 3D video therein, is inputted from said reproduce apparatus, transmits a second command message for stopping reproduction of said 3D content and the first command message to said reproduce apparatus, and presents the second guidance message, when receiving an instruction of reproducing said 3D content from a user, transmits a third command message for reproducing said 3D content to said reproduce apparatus, and
    said reproduce apparatus, when receiving the second command message, stops the reproduction of said 3D content, and when receiving the third command message reproduces said 3D content without outputting the first guidance message, and thereby to output.

3. The video display system, as described in claim 1, wherein
    presentation of the second guidance message on said display apparatus is conducted by outputting voices.

4. The video display system, as described in claim 1, wherein
    presentation of the second guidance message on said display apparatus is conducted by displaying said second guidance message.

5. A display apparatus, for displaying content outputted from a reproduce apparatus, wherein said apparatus
    transmits a first command message for suppressing an output of a first guidance message for prompting preparation of viewing/listening of a 3D video to said reproduce apparatus, thereby to present a second guidance message for prompting the preparation of the viewing/listening of the 3D video, the first guidance message is produced by the reproduce apparatus and the second guidance message is produced by the display apparatus and displays said 3D video outputted from the reproduce apparatus without the message for prompting the preparation of the viewing/listening of the 3D video.

6. The display apparatus, as described in the claim 5, wherein
said apparatus, when being inputted a 3D content, including the 3D video therein, from said reproduce apparatus, transmits a second command message for stopping reproduction of said 3D content and the first command message, to said reproduce apparatus, and
when receiving an instruction of reproducing said 3D content from a user, transmits a third command message for reproducing said 3D content, to said reproduce apparatus.

7. The display apparatus, as described in claim 5, wherein presentation of the second guidance message on said display apparatus is conducted by outputting voices.

8. The display apparatus, as described in claim 5, wherein presentation of the second guidance message on said display apparatus is conducted by displaying said second guidance message.

9. A method for displaying in a video display system, having a reproduce apparatus, which is configured to reproduce content, thereby to output, and a display apparatus, which is configured to display the content outputted from said reproduce apparatus, comprising the following steps of:
a step for transmitting a command message for suppressing an output of a first guidance message for prompting preparation of viewing/listening of a 3D video, from said display apparatus to said reproduce apparatus, wherein the first guidance message is produced by the reproduce apparatus;
a step for said display apparatus to present a second guidance message for prompting the preparation of the viewing/listening of the 3D video, wherein the second guidance message is produced by the display apparatus; and
a step for said reproduce apparatus to reproduce said 3D content, without outputting the first guidance message to the display apparatus, and thereby outputting.

10. The method for displaying, as described in claim 9, wherein presentation of the second guidance message on said display apparatus is conducted by outputting voices.

11. The method for displaying, as described in claim 9, wherein
presentation of the second guidance message on said display apparatus is conducted by displaying said second guidance message.

12. A method for displaying in a video display system, having a reproduce apparatus which is configured to reproduce content, thereby to output, and a display apparatus which is configured to display the content outputted from said reproduce apparatus, comprising the following steps of:
a step for inputting a 3D content, including the 3D video therein, from said reproduce apparatus to said display apparatus;
a step for transmitting a first command message for suppressing a first guidance message for prompting preparation of viewing/listening of the 3D video, and a second command message for stopping reproduction of the 3D content, from said display apparatus to said reproduce apparatus, wherein the first guidance message is produced by the reproduce apparatus;
a step for said reproduce apparatus to stop the reproduction of said 3D content, when said reproduce apparatus receives a message for stopping the reproduction of the 3D content;
a step for said display apparatus presents a second guidance message for prompting the preparation of the viewing/listening of the 3D video, wherein the second message is produced by the display apparatus;
a step for said display apparatus to transmit a third command message for reproducing said 3D content, to said reproduce apparatus, when receiving an instruction for reproducing said 3D content from a user; and
a step for said reproduce apparatus to reproduce said 3D content without outputting the first guidance message when said reproduce apparatus receives the third command message and thereby to output.

* * * * *